(12) United States Patent
Cheng et al.

(10) Patent No.: US 7,671,811 B2
(45) Date of Patent: Mar. 2, 2010

(54) ANTENNA DEVICE WITH GROUND PLANE COUPLED TO CONDUCTIVE PORTION OF AN ELECTRONIC DEVICE

(75) Inventors: Yu-Chiang Cheng, Taipei (TW); Ping-Cheng Chang, Chaozhou Town (TW); Cheng-Zing Chou, Xinying (TW)

(73) Assignee: Getac Technology Corporation, Hsinchu (TW)

( * ) Notice: Subject to any disclaimer, the term of this patent is extended or adjusted under 35 U.S.C. 154(b) by 166 days.

(21) Appl. No.: 11/878,674

(22) Filed: Jul. 26, 2007

(65) Prior Publication Data

US 2008/0169986 A1    Jul. 17, 2008

Related U.S. Application Data

(63) Continuation-in-part of application No. 11/651,981, filed on Jan. 11, 2007, now abandoned.

(51) Int. Cl.
*H01Q 1/24* (2006.01)
*H01Q 1/48* (2006.01)

(52) U.S. Cl. ........................................ 343/702; 343/846

(58) Field of Classification Search .......... 343/700 MS, 343/702, 846

See application file for complete search history.

(56) References Cited

U.S. PATENT DOCUMENTS

| 6,724,348 | B2 * | 4/2004 | Fang | 343/702 |
| 6,995,718 | B2 * | 2/2006 | Fang | 343/702 |
| 7,187,331 | B2 * | 3/2007 | Chen et al. | 343/702 |
| 7,233,294 | B2 * | 6/2007 | Fang | 343/702 |
| 2005/0195119 | A1 | 9/2005 | Gaucher et al. | |

* cited by examiner

*Primary Examiner*—Shih-Chao Chen
(74) *Attorney, Agent, or Firm*—Quintero Law Office (57) ABSTRACT

Disclosed is an antenna device arranged inside a display module of an electronic device with a conductive portion. The antenna device includes an antenna element with a ground plane and a signal feeding end for transceiving a wireless signal, an antenna signal feeding line coupled to the signal feeding end of the antenna element for feeding the wireless signal transceived by the antenna element. At least one mounting element for fixing the antenna element onto the casing and forcing the ground plane of the antenna electrically contacting with the conductive portion of the casing, so that the conductive porting serves as an extended ground for the ground plane of the antenna element.

15 Claims, 9 Drawing Sheets

ANTENNA DEVICE WITH GROUND PLANE COUPLED TO CONDUCTIVE PORTION OF AN ELECTRONIC DEVICE

CROSS-REFERENCES TO RELATED APPLICATIONS

This application is a continuation-in-part of Ser. No. 11/651,981 filed on Jan. 11, 2007, now abandoned entitled "Antenna Device with Antenna Element Coupled to Anti-EMI Plate of an Electronic Device".

FIELD OF THE INVENTION

The present invention relates to an antenna device used in wireless technology, and in particular to an antenna element with a ground plane coupled to a conductive plate or conductive portion of an electronic device.

BACKGROUND OF THE INVENTION

With the burgeoning of the wireless technologies nowadays, antenna devices for transceiving wireless signals have been widely utilized in electronic devices such as portable personal computers, cell phones, personal digital assistants and digital televisions capitalizing wireless transceiving. Hence the enhancement of the stability and the radiation efficiency of the antenna devices has become one of the most important aspects considering wireless technologies. The inventors, therefore, take a portable personal computer as an example to illustrate relative art.

Figure 1:
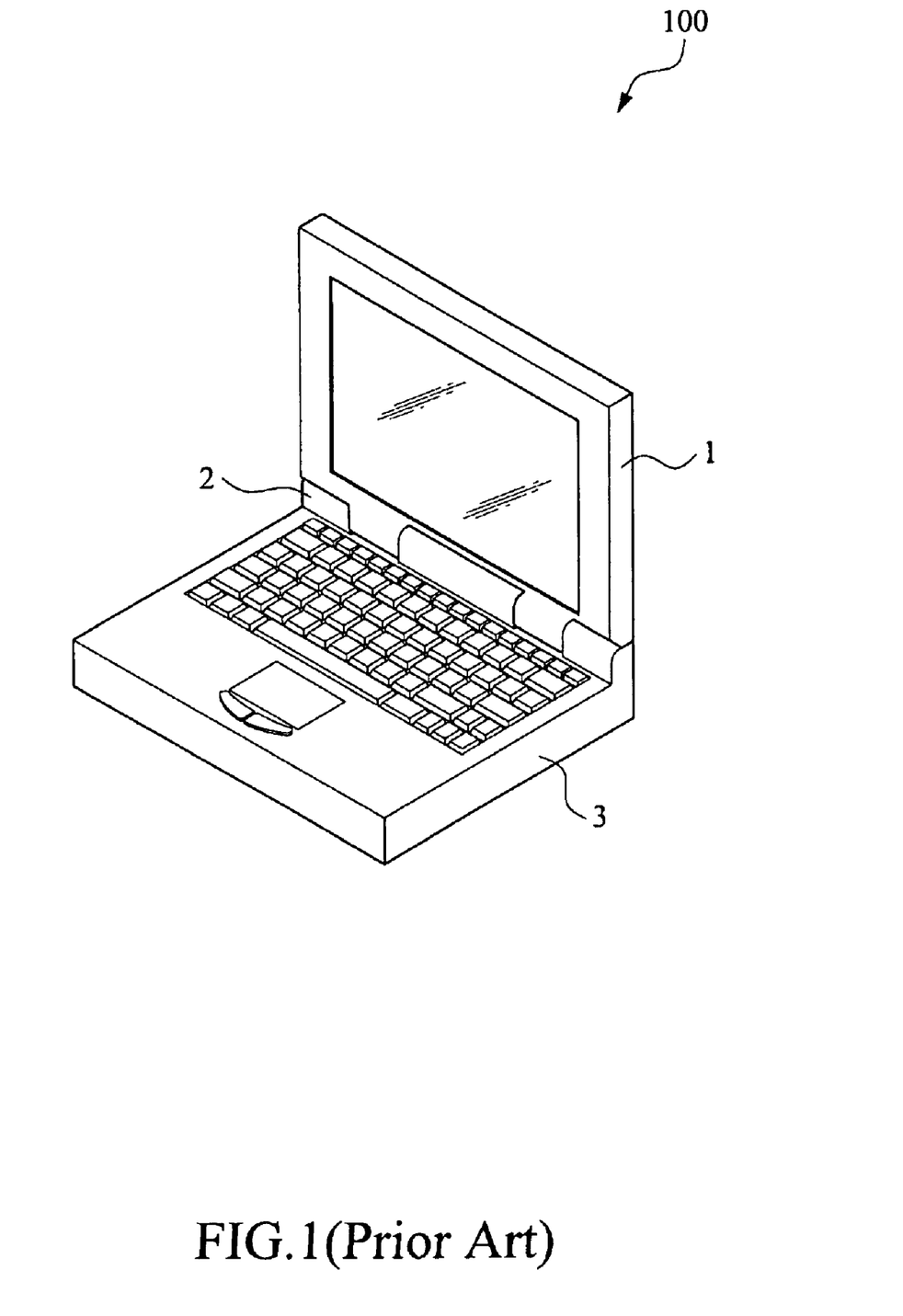
FIG. 1 is an assembled perspective view of an electronic device provided with a conventional antenna device therein.

With reference to the drawings and in particular to FIG. 1, which is an assembled perspective view of an electronic device provided with a conventional antenna element therein, the electronic device 100 includes a display module 1, a pivot mechanism 2 and a main body 3, wherein the display module 1 is integrated with the main body 3 by the pivot mechanism 2.

Figure 2:
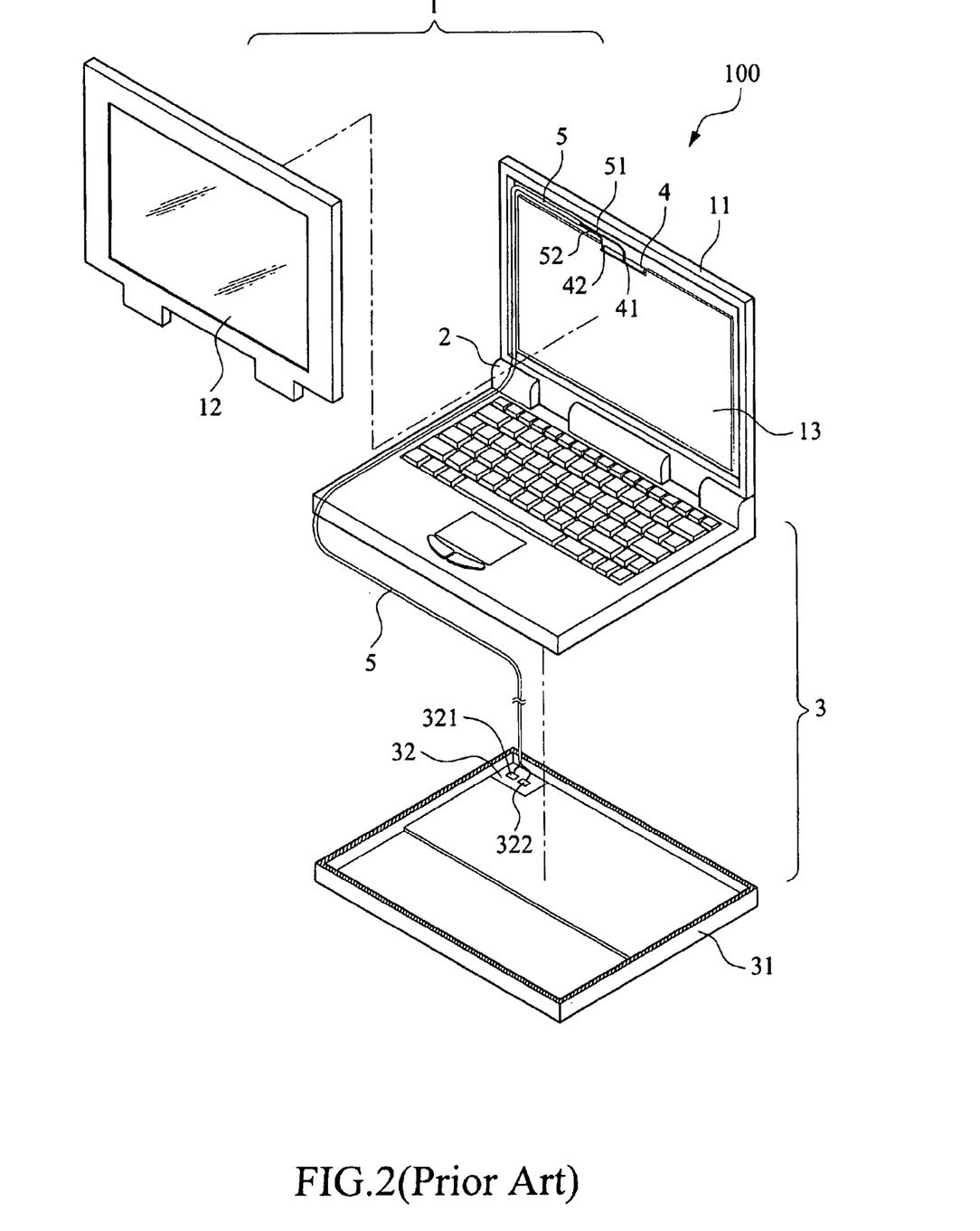
FIG. 2 is an exploded perspective view of FIG. 1.

Please refer to FIG. 2 that is an exploded perspective view of FIG. 1. As shown in the figure, the display module 1 includes a display module casing 11, a display module screen 12 and an EMI (electromagnetic interference) shielding plate or a conductive portion 13, wherein the conductive portion 13 is a thin metal plate arranged on an inner surface of the display module casing 11 for shielding the display module 1 from possible electromagnetic interferences. The main body 3 includes a main body casing 31 and an antenna transceiving module 32, which is provided with an antenna signal feeding line connecting end 321 and an antenna transceiving module ground connecting end 322, wherein the antenna transceiving module 32 is arranged inside the main body casing 31.

An antenna device 4, which is electrically connected to the antenna module 32 by a coaxial cable 5, is also arranged at a predetermined position of the display module 1 for transceiving a wireless signal, wherein the coaxial cable 5 includes an antenna signal feeding line 51 and a ground connecting line 52.

Figure 3:
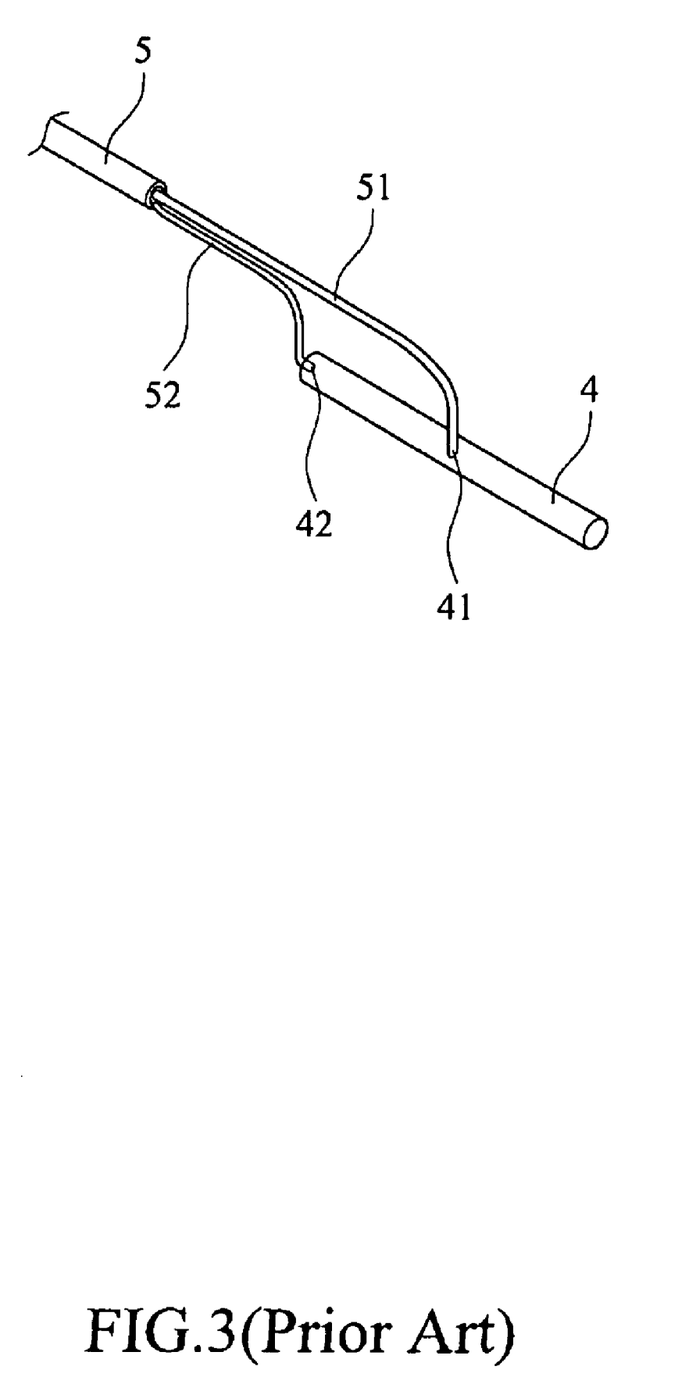
FIG. 3 is a perspective view of a connection of an antenna element and a coaxial cable with an antenna signal feeding line and a ground connecting line of conventional use.

With reference to FIG. 3, which is a perspective view of the connection of the antenna device 4 and the coaxial cable 5 with the antenna signal feeding line 51 and the ground connecting line 52, one end of the antenna signal feeding line 51 is connected to a signal feeding end 41 of the antenna device 4, while the other end of the antenna signal feeding line 51 is connected to the antenna signal feeding line connecting end 321. On the other hand, one end of the ground connecting line 52 is connected to a ground connecting end 42 of the antenna device 4, while the other end of the ground connecting line 52 is connected to the antenna transceiving module ground connecting end 322 of the antenna transceiving module 32.

SUMMARY OF THE INVENTION

The antenna device of the electronic device of conventional use is coupled to the ground of the antenna transceiving module through the ground connecting line of the antenna device. Such ground is an analog ground and is not connected to the system ground. Since the area of the ground the antenna device connected to may have influence on the ability of the antenna device to prevent electromagnetic interferences, the relatively small ground of the antenna transceiving module may affect the prevention of the antenna device to electromagnetic interferences, and consequently affect the transceiving of the wireless signal of the antenna device.

In addition, since the length of the ground connecting line of conventional use is relatively longer, affections to the ability of the antenna device to prevent electromagnetic interferences is unavoidable.

The primary object of the present invention, therefore, is to provide an antenna element with a ground plane coupled to a conductive portion of the electronic device in order to provide a ground with a larger area to the antenna element.

The other object of the present invention is to provide an antenna element with a ground plane coupled to a conductive portion of the electronic device with a shorter ground connecting line.

The other object of the present invention is to provide an antenna element directly coupled to a conductive portion of the electronic device.

To realize the above objects, the present invention includes an antenna element with a ground plane and a signal feeding end for transceiving a wireless signal, an antenna signal feeding line coupled to the signal feeding end of the antenna element for feeding the wireless signal transceived by the antenna element. At least one mounting element for fixing the antenna element onto the casing and forcing the ground plane of the antenna electrically contacting with the conductive portion of the casing, so that the conductive porting serves as an extended ground for the ground plane of the antenna element.

In comparison with the conventional technologies, the present invention provides the antenna device with a larger ground through the connecting of the antenna device to the conductive portion of the electronic device through a shorter ground connecting line, hence enhances the stability and the quality of the transceiving of the wireless signal of the antenna device.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 4:
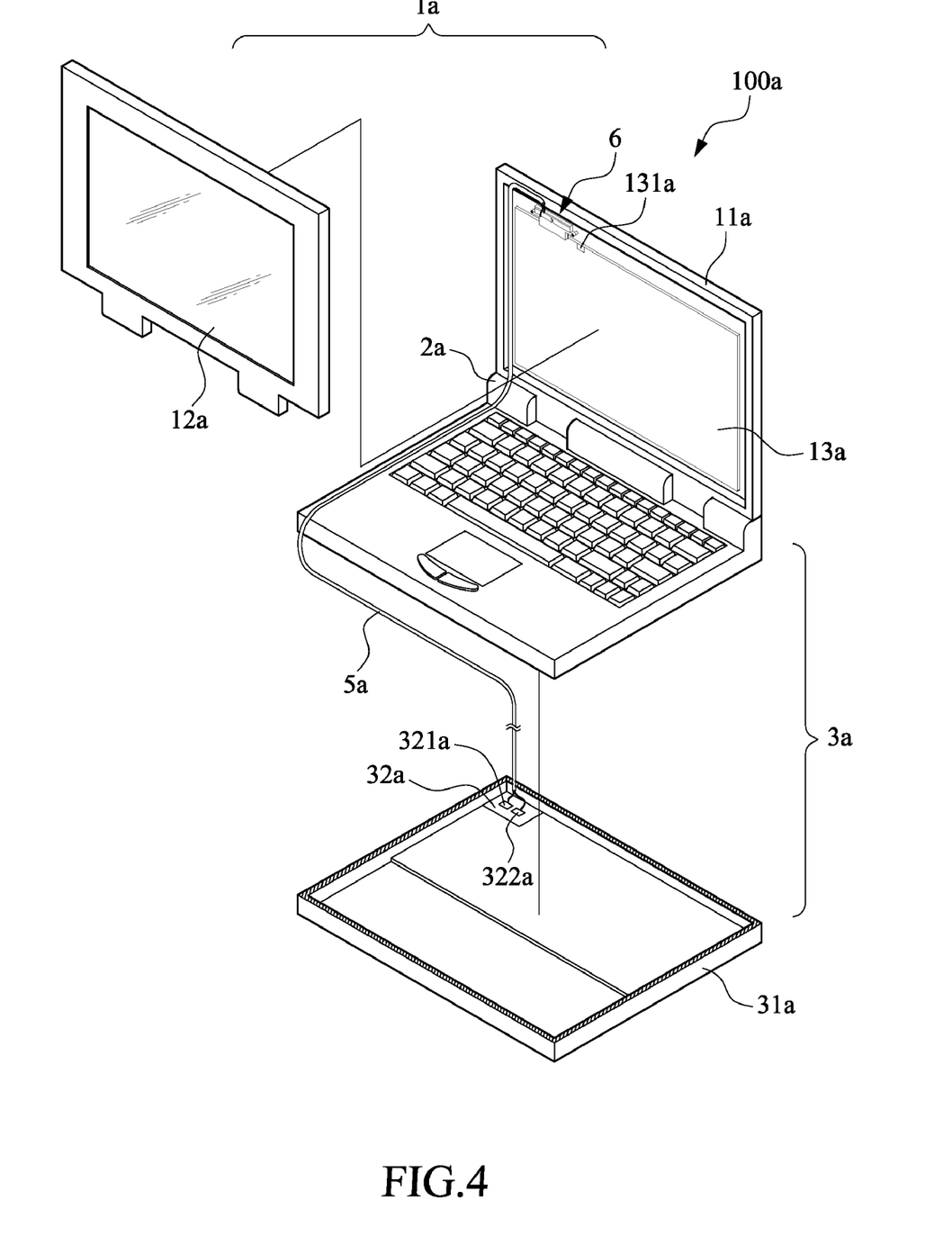
FIG. 4 is an exploded perspective view of an electronic device with an antenna element coupled to an conductive portion in accordance with a first embodiment of the present invention.

With reference to the drawing of FIG. 4, which is an exploded perspective view of an electronic device with an antenna device coupled to a conductive portion in accordance with a preferred embodiment of the present invention, an electronic device 100a includes a display module 1a, a pivot mechanism 2a and a main body 3a, wherein the display module 1a is pivotally mounted with the main body 3a by the pivot mechanism 2a; hence the display module 1a is rotatably operable around the pivot mechanism 2a to cover the main body 3a or to be lift up.

As shown in the figure, the display module 1a includes a display module casing 11a, a display module screen 12a and a conductive portion 13a, wherein the conductive portion 13a includes a conductive portion ground end 131a coupled to a ground end of the display module 1a. The main body 3a includes a main body casing 31a and an antenna transceiving module 32a, wherein the antenna transceiving module 32a is arranged inside the main body casing 31a. The antenna transceiving module 32a includes an antenna signal feeding line connecting end 321a and an antenna transceiving module ground end 322a.

Moreover, an antenna element 6 for transceiving a wireless signal is arranged at a predetermined position of the display module 1a. In the preferred embodiment of the present invention, the antenna element 6 is a flat typed PIFA antenna having a signal feeding section 61, a connection section 62, and a ground plane 63. The signal feeding section 61 and the ground plane 63 are coupled to an antenna signal feeding line 51a and a ground connecting line 52a of a coaxial cable 5a respectively.

Figure 5:
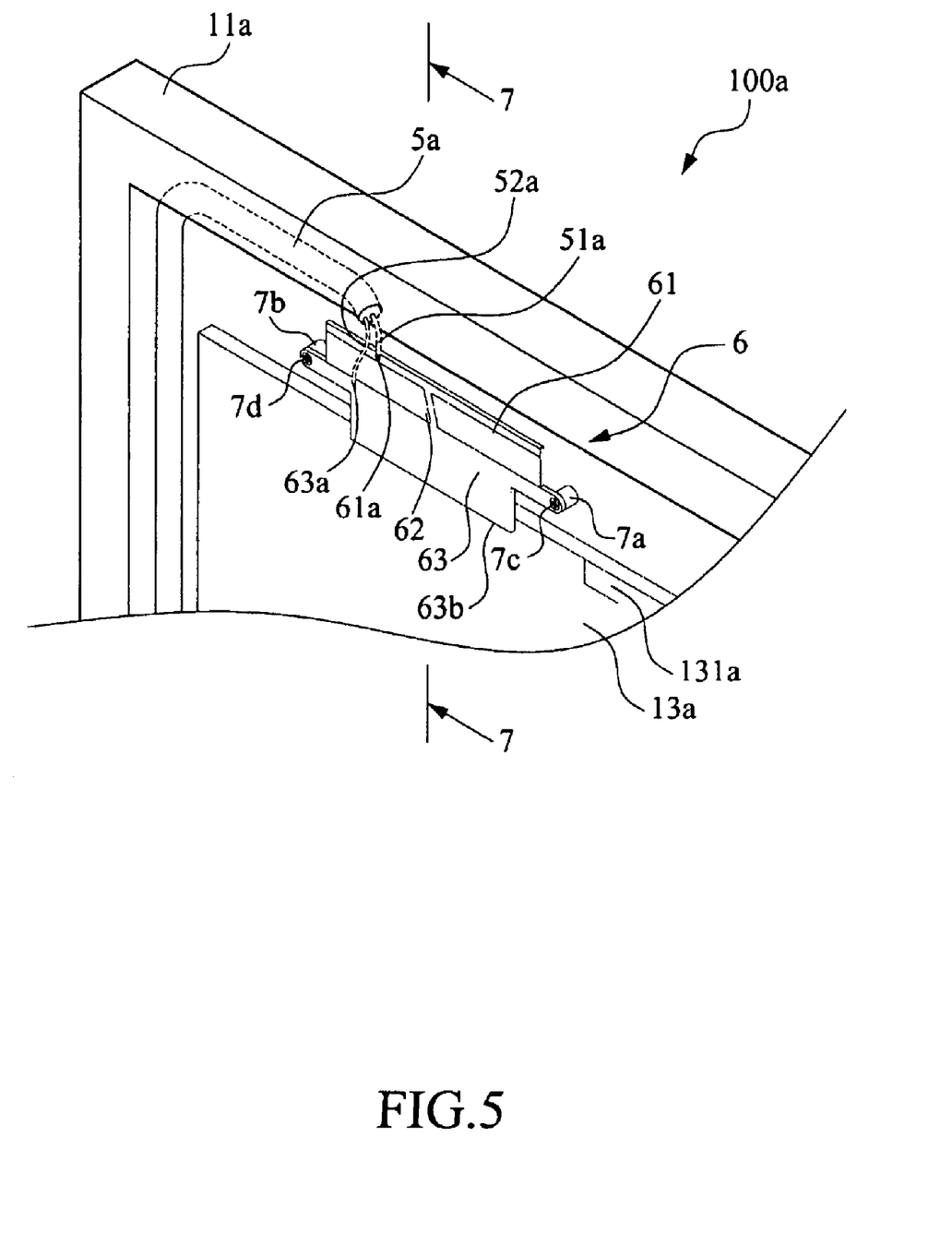
FIG. 5 is a perspective view of a connection of an antenna element, an antenna signal feeding line and a ground connecting line in accordance with a first embodiment of the present invention.
Figure 6:
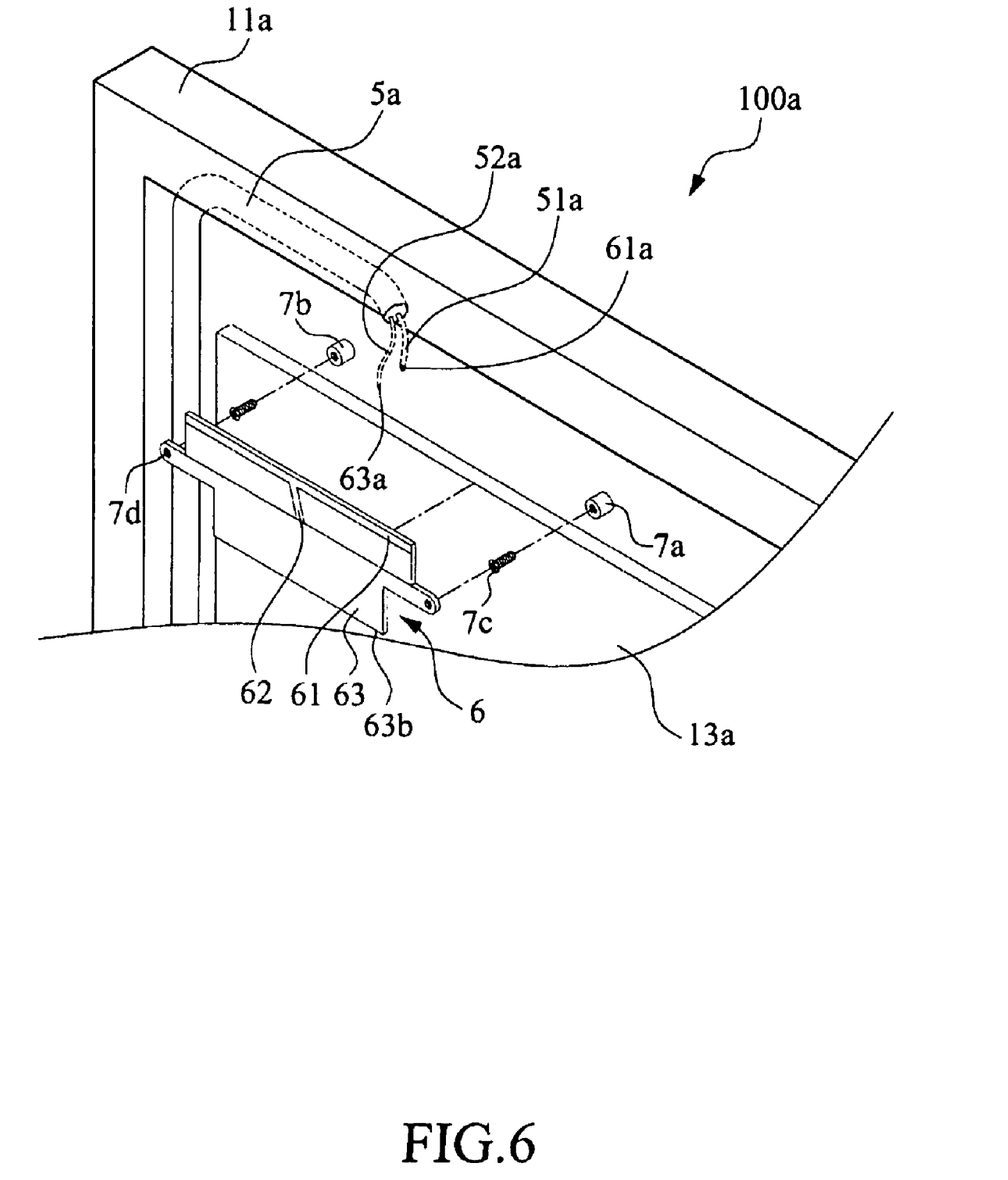
FIG. 6 is an exploded perspective view of the connection of an antenna element, an antenna signal feeding line and a ground connecting line in accordance with the first embodiment of the present invention.
Figure 7:
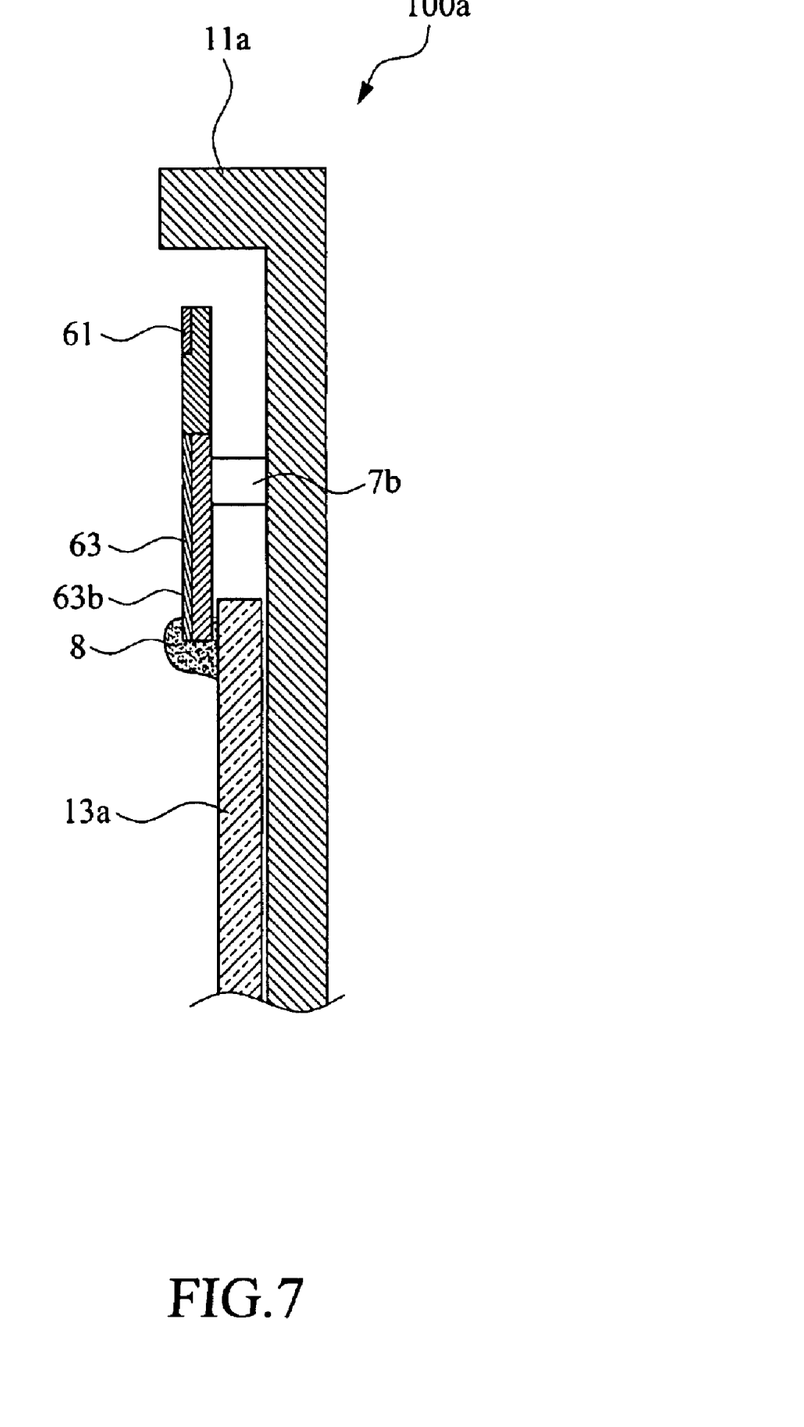
FIG. 7 is a cross-sectional view taken along line 7-7 of FIG. 5.

FIG. 5 is a perspective view of the connection of the antenna element 6, the antenna signal feeding line 51a and the ground connecting line 52a in accordance with a first embodiment of the present invention. FIG. 6 is an exploded perspective view of the connection of the antenna element 6, the antenna signal feeding line 51a and the ground connecting line 52a in accordance with the first embodiment of the present invention. FIG. 7 is a cross-sectional view taken along line 7-7 of FIG. 5. As shown in FIGS. 4 to 7, one end of the antenna signal feeding line 51a is connected to a signal feeding end 61a formed on the signal feeding section 61, while the other end of the antenna signal feeding line 51a is connected to the antenna signal feeding line connecting end 321a of the antenna transceiving module 32a. On the other hand, one end of the ground connecting line 52a is connected to a ground end 63a formed on the ground plane 63, while the other end of the ground connecting line 52a is connected to the conductive portion ground 131a of the conductive portion 13a.

The wireless signal received by the antenna element 6 is conducted to the antenna transceiving module 32a through the antenna signal feeding line 51a, and the wireless signal is processed by the antenna transceiving module 32a and is transferred to the electronic device 100a. On the contrary, data-to-be-transmitted are conducted to the antenna transceiving module 32a and processed by the antenna transceiving module 32a. The data is then transmitted by the antenna element 6 through the conducting of the antenna signal feeding line 51a.

For fixing the antenna element 6 at a selected position adjacent to the conductive portion 13a, a pair of outward fixing parts 7a, 7b are formed on an inner side of the display module casing 11a. So, the antenna element 6 may be fixed on the inner side of the display module casing 11a by screwing a pair of mounting elements 7c, 7d such as screws onto the fixing parts 7a, 7b of the display module casing 11a respectively. Besides, the ground plane 63 of the antenna element 6 is provided with a downward extended section 63b which is arranged to directly contact with the conductive portion 13a. So, the downward extended section 63b of the ground plane 63 is forced to electrically contact with the conductive portion 13a of the display module casing 11a. In this arrangement, the conductive portion 13a of the display module casing 11a serves as an extended ground for the ground plane 63 of the antenna element 6. Preferably, the downward extended section 63b of the ground plane 63 is soldered to the conductive portion 13a by solder 8, as shown in FIG. 7.

Since the antenna element 6 is coupled to a larger ground area through a simple contact structure, the enhancement of the stability of the transceiving of the wireless signal of the antenna element and the ability of the antenna element to prevent interferences is predictable.

In addition, the distance from the antenna element 6 to the ground is effectively shortened through the connection of the antenna element 6 to the conductive portion 13a. As a consequence, the ability of the antenna element 6 to tolerate interferences and the speed of the antenna element 6 to exclude noises are enhanced.

In the preferred embodiment of the present invention, the electronic device 100a is a portable personal computer (i.e. a notebook), and the conductive portion 13a, which is generally made of aluminum or tin foil, is a plate with the ability to prevent electromagnetic interferences. The utilization of any other element with the same/similar function as the conductive portion 13a, however, is to be adapted in accordance with different fields of application.

The conductive portion 13a of the previous embodiment serves as an anti-EMI plate for the electronic device 100a. Alternatively, the conductive portion 13a may be a metal plate forming a partial portion of the casing 11a for purpose of enhancing the structure strength or serving as the casing 11a.

Figure 8:
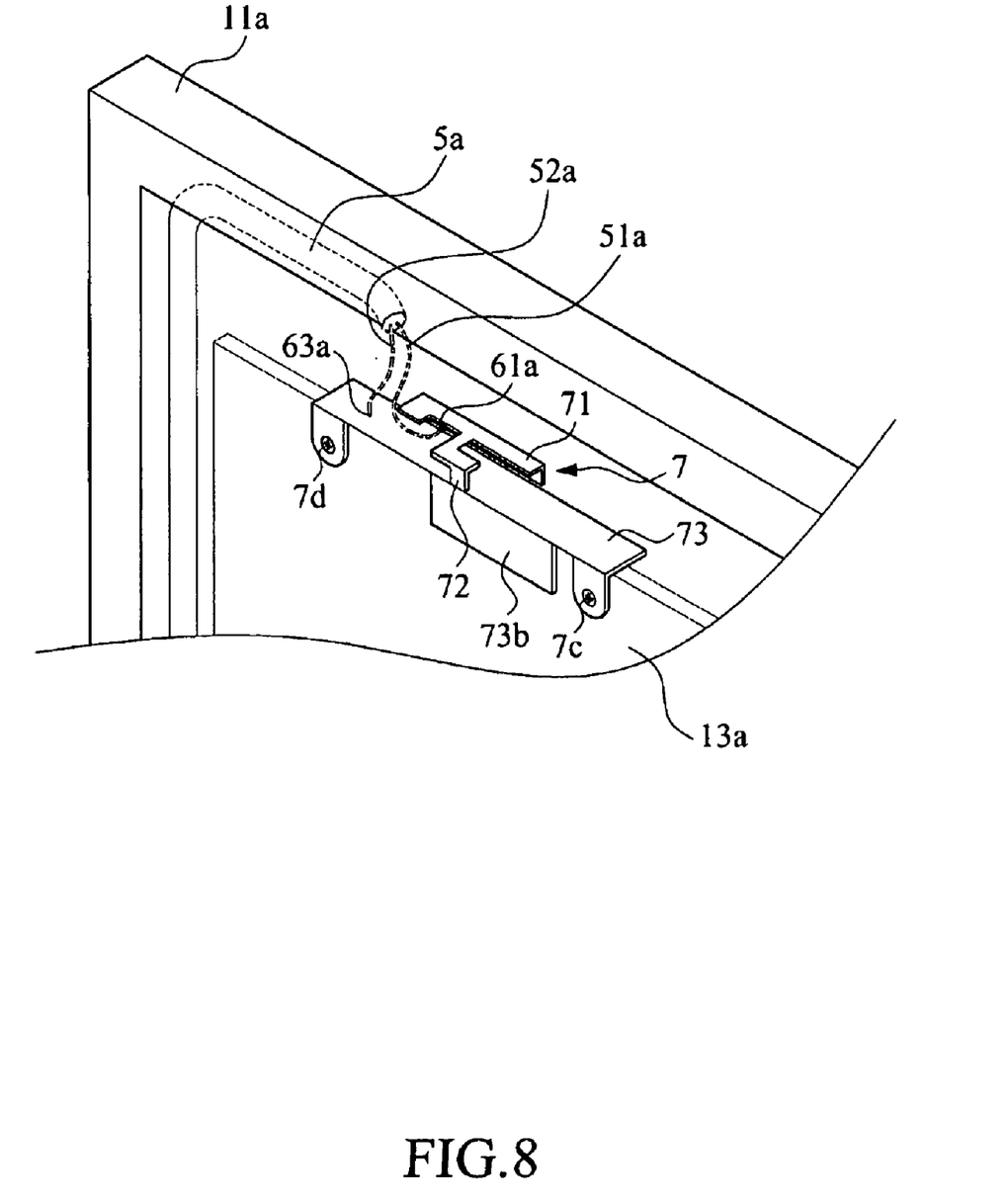
FIG. 8 is a perspective view of the connection of an antenna element, an antenna signal feeding line and a ground connecting line in accordance with a second embodiment of the present invention.
Figure 9:
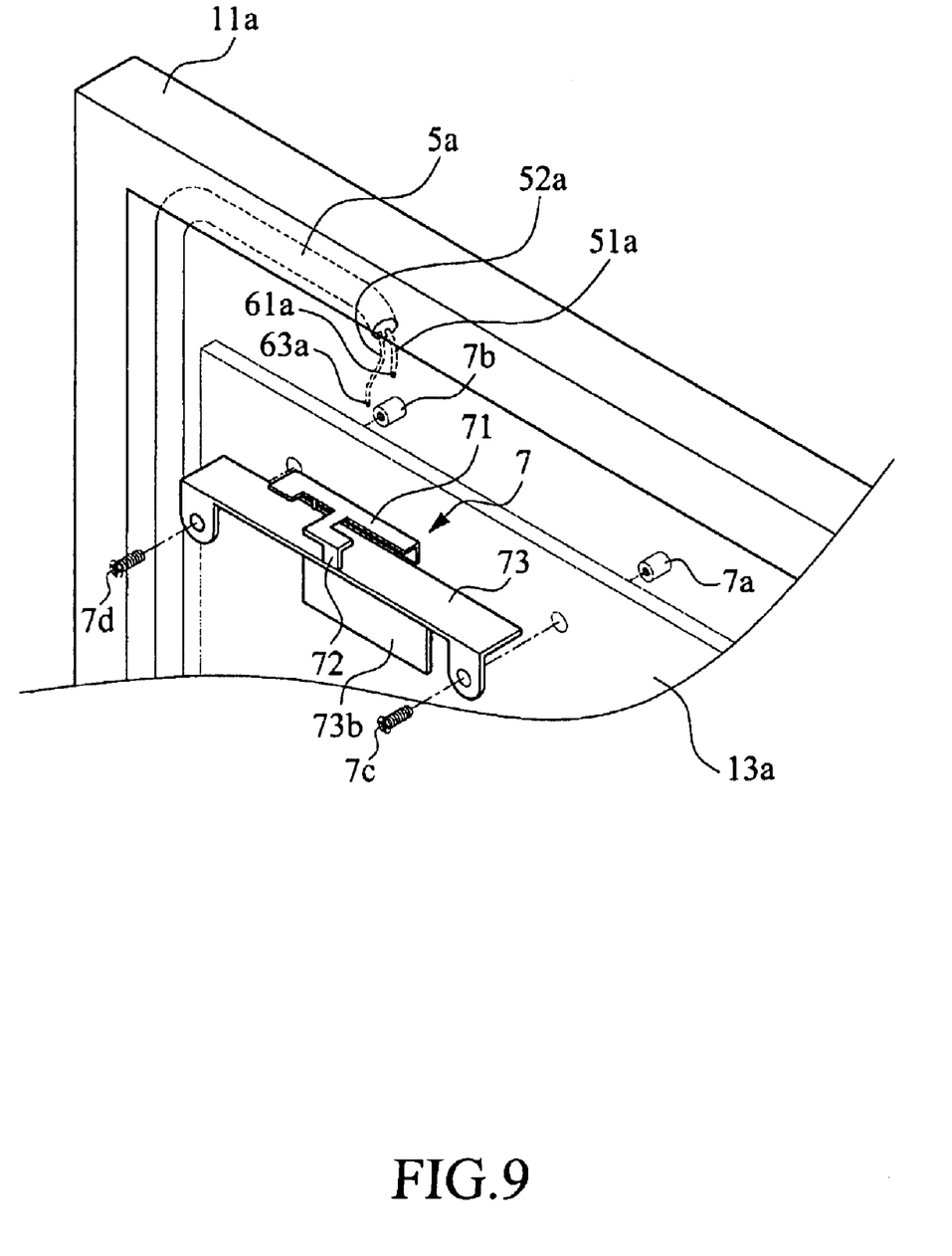
FIG. 9 is an exploded perspective view of the connection of an antenna element, an antenna signal feeding line and a ground connecting line in accordance with the second embodiment of the present invention.

FIG. 8 is a perspective view of the connection of the antenna element 7, the antenna signal feeding line 51a and the ground connecting line 52a in accordance with a second embodiment of the present invention. FIG. 9 is an exploded perspective view of the connection of the antenna element 7, the antenna signal feeding line 51a and the ground connecting line 52a in accordance with the second embodiment of the present invention. In this embodiment, the antenna element 7 is a low-profile typed PIFA antenna having a signal feeding section 71, a connection section 72, and a ground plane 73b. The signal feeding section 71 and the ground plane 73 are coupled to an antenna signal feeding line 51a and a ground connecting line 52a of a coaxial cable 5 respectively.

For fixing the antenna element 7 at a selected position adjacent to the conductive portion 13a, a pair of outward fixing parts 7a, 7b are formed on an inner side of the display module casing 11a. So, the antenna element 7 may be fixed on the inner side of the display module casing 11a by screwing a pair of mounting elements 7c, 7d such as screws onto the fixing parts 7a, 7b of the display module casing 11a respectively. Besides, the ground plane 73 of the antenna element 7 is provided with a downward extended section 73b which is arranged to directly contact with the conductive portion 13a. So, the downward extended section 73b of the ground plane 73 is forced to electrically contact with the conductive portion 13a of the display module casing 11a. The conductive portion 13a of the display module casing 11a serves as an extended ground for the ground plane 73 of the antenna element 7.

While the invention has been described in connection with what is presently considered to the most practical and preferred embodiments, it is to be understood that the invention is not to be limited to the disclosed embodiments, but on the contrary, is intended to cover various modifications and equivalent arrangement included within the spirit and scope of the appended claims.

What is claimed is:

1. An antenna device arranged inside a casing of an electronic device, comprising:
    a display module screen;
    a conductive portion arranged on an inner surface of the casing;
    an antenna element with a ground plane and a signal feeding section for transceiving a wireless signal;
    an antenna signal feeding line coupled to the signal feeding end of the antenna element for feeding the wireless signal transceived by the antenna element to the electronic device; and
    at least one mounting element for fixing the antenna element onto the casing and forcing the ground plane of the antenna element electrically into electrical contact with the conductive portion of the casing, so that the conductive porting serves as an extended ground for the ground plane of the antenna element, wherein at least a portion of the ground plane of the antenna element is arranged in a gap separating the conductive portion and the display module screen such that said portion of the ground plane is sandwiched between a surface of the conductive portion and a facing surface of the display module screen.

2. The antenna device as claimed in claim 1, wherein the conductive portion is a thin plate made of an electro-conductive material mounted on the inner surface of the casing.

3. The antenna device as claimed in claim 1, wherein the conductive portion is an anti-EMI plate of the electronic device.

4. The antenna device as claimed in claim 1, wherein the conductive portion is made of metal plate and forms at least a portion of the casing.

5. The antenna device as claimed in claim 1, wherein the conductive portion is connected to a ground end of the electronic device.

6. The antenna device as claimed in claim 1, wherein the mounting element comprises at least one screw.

7. The electronic device as claimed in claim 1, wherein the casing and display module screen are mounted together to form a display module, and the electronic device is a portable computer with the display module mounted on the portable computer via a pivot mechanism so that the display module is rotatably operable around the pivot mechanism, and the conductive portion is arranged inside the display module.

8. The electronic device as claimed in claim 1, wherein the antenna element is a planner typed PIFA antenna.

9. The electronic device as claimed in claim 1, wherein the antenna element is a low-profile typed PIFA antenna.

10. An antenna device arranged inside a casing of an electronic device, comprising:
    a display module screen;
    a conductive portion arranged on an inner surface of the casing;
    an antenna element with a ground plane and a signal feeding section for transceiving a wireless signal; and
    an antenna signal feeding line coupled to the signal feeding end of the antenna element for feeding the wireless signal transceived by the antenna element to the electronic device;
    wherein the ground plane of the antenna element directly contacts with the conductive portion of the casing, so that the conductive porting serves as an extended ground for the ground plane of the antenna element, and wherein at least a portion of the ground plane of the antenna element is arranged in a gap separating the conductive portion and the display module screen such that said portion of the ground plane is sandwiched between a surface of the conductive portion and a facing surface of the display module screen.

11. The antenna device as claimed in claim 10, wherein the conductive portion is a thin plate made of an electro-conductive material mounted on the inner surface of the casing.

12. The antenna device as claimed in claim 10, wherein the conductive portion is an anti-EMI plate of the electronic device.

13. The antenna device as claimed in claim 10, wherein the conductive portion is made of metal plate and forms at least a portion of the casing.

14. The antenna device as claimed in claim 10, wherein the conductive portion is connected to a ground end of the electronic device.

15. The electronic device as claimed in claim 10, wherein the casing and display module screen are mounted together to form a display module, and the electronic device is a portable computer with the display module mounted on the portable computer via a pivot mechanism so that the display module is rotatably operable around the pivot mechanism, and the conductive portion is arranged inside the display module.

* * * * *